United States Patent
Mukherjee

(10) Patent No.: US 11,556,633 B2
(45) Date of Patent: Jan. 17, 2023

(54) SECURITY THREAT DETECTION IN HOSTED GUEST OPERATING SYSTEMS

(71) Applicant: BlackBerry Limited, Waterloo (CA)

(72) Inventor: Biswaroop Mukherjee, Stittsville (CA)

(73) Assignee: BlackBerry Limited, Waterloo (CA)

( * ) Notice: Subject to any disclaimer, the term of this patent is extended or adjusted under 35 U.S.C. 154(b) by 305 days.

(21) Appl. No.: 16/733,375

(22) Filed: Jan. 3, 2020

(65) Prior Publication Data

US 2021/0209223 A1 Jul. 8, 2021

(51) Int. Cl.
*G06F 21/53* (2013.01)
*G06F 9/455* (2018.01)
*G06F 21/56* (2013.01)

(52) U.S. Cl.
CPC .......... *G06F 21/53* (2013.01); *G06F 9/45558* (2013.01); *G06F 21/566* (2013.01); *G06F 2009/45587* (2013.01); *G06F 2009/45591* (2013.01); *G06F 2009/45595* (2013.01)

(58) Field of Classification Search
CPC .... G06F 21/53; G06F 21/566; G06F 9/45558; G06F 2009/45587; G06F 2009/45591; G06F 2009/45595
See application file for complete search history.

(56) References Cited

U.S. PATENT DOCUMENTS

| | | | | |
|---|---|---|---|---|
| 10,461,937 | B1 * | 10/2019 | Allen | H04L 9/3234 |
| 2011/0082962 | A1 * | 4/2011 | Horovitz | G06F 11/301 |
| | | | | 718/1 |
| 2015/0212842 | A1 * | 7/2015 | Ghosh | G06F 9/45558 |
| | | | | 718/1 |
| 2017/0147816 | A1 | 5/2017 | Schilling et al. | |
| 2020/0250306 | A1 * | 8/2020 | Pendyala | G06F 16/1748 |
| 2021/0263779 | A1 * | 8/2021 | Haghighat | G06F 9/5061 |

OTHER PUBLICATIONS

Extended European Search Report, EP Application No. 21150115.0 dated May 25, 2021.

(Continued)

*Primary Examiner* — Ashokkumar B Patel
*Assistant Examiner* — William B Jones
(74) *Attorney, Agent, or Firm* — Rowand LLP

(57) ABSTRACT

A guest operating system executing on a virtual machine hosted by a host operating system may forward information about the state of the guest operating system to the host operating system for analysis regarding security threats. The host operating system may also forward information about the state of the host operating system to the guest operating system for analysis regarding security threats. One or both of the guest operating system and the host operating system may also forward the information about their state(s) to a remote server for analysis regarding security threats to the machine running the host operating system and hosting the virtual machine running the guest operating system. Security threats may be identified based on a detection of abnormal behavior. Abnormal behavior may be detected using machine-learning models. The machine-learning models may be trained/refined over time based on collected state information.

20 Claims, 3 Drawing Sheets

(56) References Cited

OTHER PUBLICATIONS

Payne Joshua et al: Towards Deep Federated Defenses Against Malware in Cloud Ecosystems, 2019 First IEEE International Conference on Trust. Privacy and Security in Intelligent Systems and Applications (TPS-ISA). IEEE. Dec. 12, 2019 (Dec. 12, 2019).
Mengwei Yang et al: "The Tradeoff Between 1-15 Privacy and Accuracy in Anomaly DetectionUsing Federated XGBoost" arxiv. org. Cornell University Library. 201OLIN Library Cornell University Ithaca. NY, 14853.. Jul. 16, 2019 (Jul. 16, 2019).

* cited by examiner

SECURITY THREAT DETECTION IN HOSTED GUEST OPERATING SYSTEMS

TECHNICAL FIELD

The present disclosure relates to information security and, more particularly, to detecting security threats in the context of virtualization and guest operating systems hosted by a host operating system.

BACKGROUND

A computing device may host one or more virtual machines. Virtual machines provide a duplicate of a real-world computing device. The hosting of virtual machines may be referred to as virtualization. Operating system software hosting one or more virtual machines may be referred to as a host operating system. Virtualization may be controlled by software referred to as a hypervisor. In some cases, a hypervisor may be provided by a host operating system. For example, a hypervisor may include one or more processes that execute on the host operating system. Operating system (OS) software executing on a virtual machine may be referred to as a guest operating system.

Computing raises the possibility of information security threats such as, for example, due to malicious software. In the case of a virtualization, such security threats may arise in the context of a host computing device and the host operating system and/or in the context of a virtual machine hosted by the host computing device and the guest operating system executing on that virtual machine. As such, security threats may affect one or both of the host operating system and/or the guest operating system.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
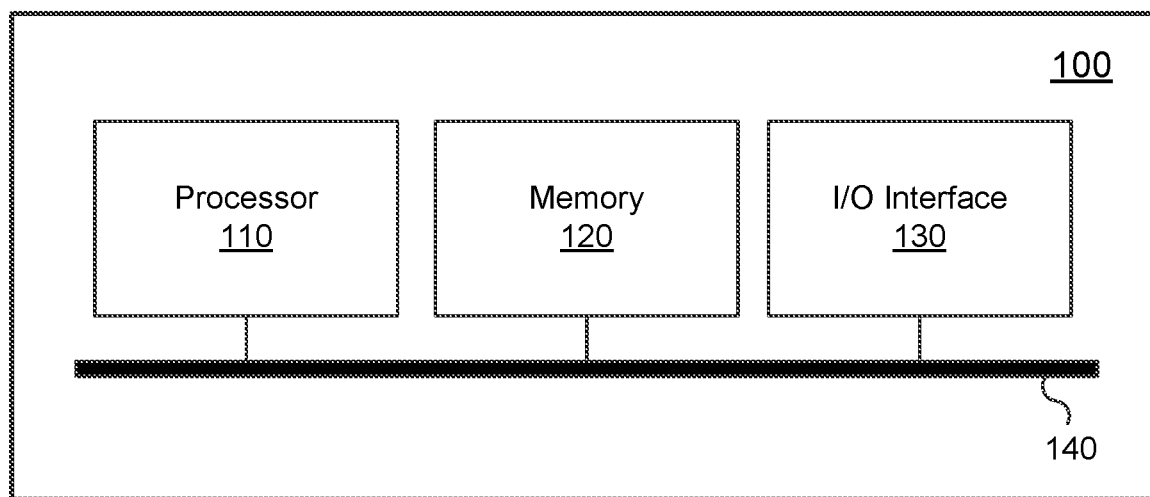
FIG. 1 shows a high-level block diagram of an example computing device.

According to the subject matter of the present application there may be provided a computer system. The computer system may include at least one processor and a memory coupled to the at least one processor. The memory may store instructions corresponding to a host operating system that, when executed by the at least one processor, cause the host operating system to host a virtual machine executing a guest operating system. The guest operating system may be configured to run an internal monitor process that collects information about the state of the guest operating system and forwards that information to a hypervisor monitor process running on the host operating system for analysis regarding a security threat to the guest operating system.

Advantageously, in this way, security threats affecting a guest operating system may be identified.

In some implementations, the analysis regarding the security threat to the guest operating system may include executing a machine learning model trained to identify abnormal behavior by the guest operating system. It may be that the machine learning model is trained over time based on the information about the state of the guest operating system to distinguish abnormal behavior by the guest operating system from normal behavior by the guest operating system.

In some implementations, the analysis regarding the security threat to the guest operating system may include comparing the information about the state of the guest operating system against one or more rules. Each of the rules may be intended to match one or more possible threats to the guest operating system.

In some implementations, the internal monitor process may be further configured to forward the information about the state of the guest operating system to a remote computer system for analysis regarding the security threat to the computer system.

In some implementations, the hypervisor monitor process may be configured to forward information about the state of the host operating system to the remote computer system for use in the analysis regarding the security threat to the computer system. It may be that the remote computer system detects the security threat to the computer system based on a detection of abnormal behavior by at least one of the host operating system or the guest operating system. For example, it may be that the remote computer system identifies abnormal behavior by comparing the information about the state of the guest operating system and the information about the state of the host operating system to state information provided by a plurality of other computer systems. In a particular example, it may be that the comparing of the information about the state of the guest operating system and the information about the state of the host operating system to state information provided by the plurality of other computer systems is based on analysis of the information about the state of the guest operating system and the information about the state of the host operating system using a machine learning model trained to identify abnormal behavior using state information collected from the plurality of other computer systems over time.

In some implementations, the hypervisor monitor process may be configured to trigger one or more actions responsive to detection of a security threat by the guest operating system.

In some implementations, that host operating system may also host a second virtual machine. It may be that the hypervisor monitor process also receives information about the state of a second guest operating system executing on the second virtual machine.

According to the subject matter of the present application there may be provided a computer-implemented method. The method may include: collecting, by an internal monitor process running on a guest operating system executing on a virtual machine hosted by a host operating system of a computer system, information about the state of the guest operating system; sending, by the internal monitor process to a hypervisor monitor process running on the host operating system, the information about the state of the guest operating system; analyzing, by the hypervisor monitor process, the information about the state of the guest operating system to detect a security threat to the guest operating system; and, responsive to detecting the security threat, triggering, by the hypervisor monitor process, one or more actions intended to address the security threat.

In some implementations, it may be the security threat relates to a particular application installed on the guest operating system and that the one or more actions include at least one of triggering an uninstallation of the particular application or an update to the particular application.

In some implementations, the information about the state of the guest operating system may be sent by the internal monitor process to the hypervisor monitor process over an encrypted channel. The encrypted channel may employ a shared memory block. In some cases, the method may further include: during provisioning of the host operating system, storing a first key for use by the hypervisor monitor process; and during provisioning of the guest operating system, storing a second key for use by the internal monitor process. The encrypted channel may be established using the first key and the second key. In some implementations, the first key and/or the second key may be stored in a hardware security module/hardware security modules.

According to the subject matter of the present application there may be provided a computer-readable storage medium. The computer-readable storage medium may be a non-transitory computer-readable storage medium. The computer readable medium may store instructions corresponding to a first operating system adapted to host one or more virtual machines and to receive information about states of guest operating systems executing on the one or more virtual machines and to analyze that information to detect a security threat to the one or more virtual machines. In some implementations, the first operating system may be adapted to analyze the information using a machine learning model trained to detect possible security threats.

In some implementations, the computer-readable storage medium may further store instructions corresponding to a guest operating system adapted to collect information about the state of the guest operating system when executed and to forward that information to the first operating system for analysis to detect a security threat to a particular one of the one or more virtual machines that is executing the guest operating system.

Other example embodiments of the present disclosure will be apparent to those of ordinary skill in the art from a review of the following detailed description in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 shows a high-level block diagram of an example computer system. In this example, the computing system comprises an example computing device 100. As illustrated, the example computing device 100 includes a processor 110, a memory 120, and an I/O interface 130. The foregoing modules of the example computing device 100 are in communication over and communicatively coupled to one another by a bus 140. As further described below, the example computing device 100 may host virtual machines.

The processor 110 includes a hardware processor and may, for example, include one or more processors using ARM, x86, MIPS, or PowerPC™ instruction sets. For example, the processor 110 may include Intel™ Core™ processors, Qualcomm™ Snapdragon™ processors, or the like. It may be that the processor 110 provides hardware support for virtualization. For example, the processor 110 may include one or more instructions and/or architectural features such as may be utilized by a host operating system and/or a hypervisor to control virtualization for hosting the virtual machines.

The memory 120 comprises a physical memory. The memory 120 may include random access memory, read-only memory, persistent storage such as, for example, flash memory, a solid-state drive or the like. Read-only memory and persistent storage are a computer-readable medium and, more particularly, may each be considered a non-transitory computer-readable storage medium. A computer-readable medium may be organized using a file system such as may be administered by software governing overall operation of the example computing device 100.

The I/O interface 130 is an input/output interface. The I/O interface 130 allows the example computing device 100 to receive input and provide output. For example, the I/O interface 130 may allow the example computing device 100 to receive input from or provide output to a user. In another example, the I/O interface 130 may allow the example computing device 100 to communicate with a computer network. The I/O interface 130 may serve to interconnect the example computing device 100 with one or more I/O devices such as, for example, a keyboard, a display screen, a pointing device like a mouse or a trackball, a fingerprint reader, a communications module, a hardware security module (HSM) (e.g., a trusted platform module (TPM)), or the like. Virtual counterparts of the I/O interface 130 and/or devices accessed via the I/O interface 130 may be provided such as, for example, by a host operating system and/or a hypervisor, to some or all of the virtual machines as may be hosted by the example computing device 100 under supervision of the host operating system and/or the hypervisor.

Software comprising instructions is executed by the processor 110 from a computer-readable medium. For example, software corresponding to a host operating system and/or software corresponding to software being executed by a virtual machine (e.g., a guest operating system) may be loaded into random-access memory from persistent storage or flash memory of the memory 120. Additionally or alternatively, software may be executed by the processor 110 directly from read-only memory of the memory 120.

In another example, software may be accessed via the I/O interface 130.

As mentioned above, the example computing device 100 may host virtual machines.

Figure 2:
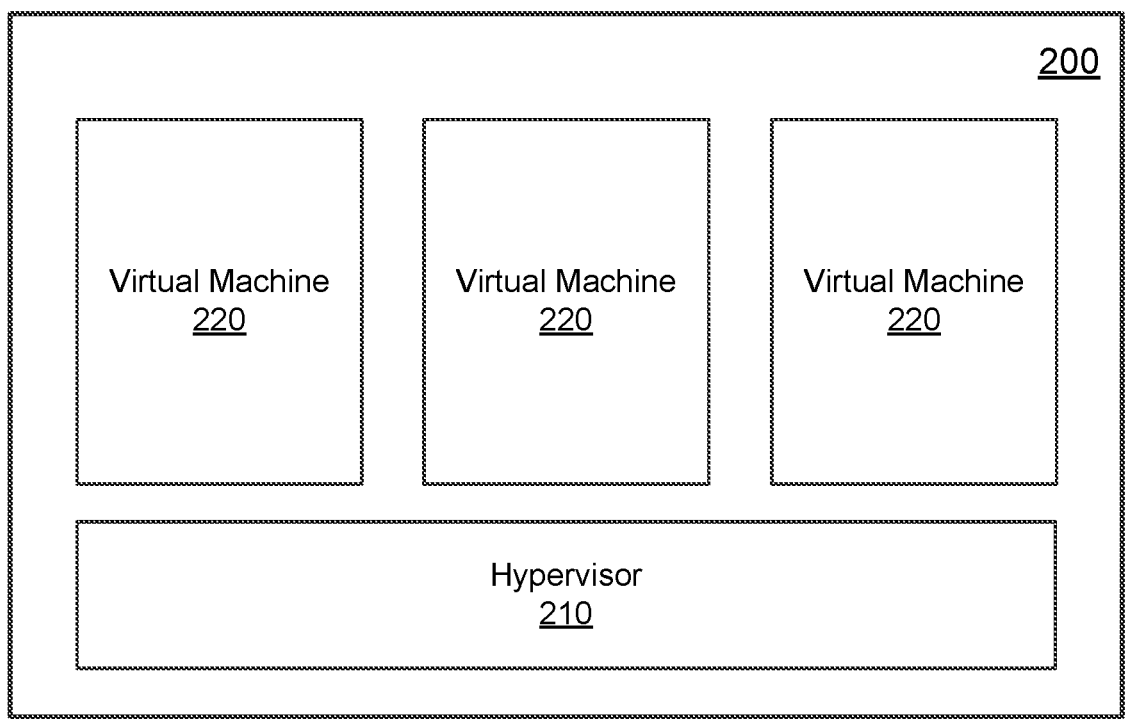
FIG. 2 shows an architectural diagram showing virtual machines such as may be hosted by the example computing device of FIG. 1.

FIG. 2 provides an architectural diagram 200 showing virtual machines such as may be hosted by the example computing device 100.

As illustrated, a hypervisor 210 may supervise a group of virtual machines such as may be hosted by the example computing device 100. For example, as shown, the hypervisor 210 may supervise one or more virtual machines 220.

The hypervisor and/or other software executing on the example computing device 100 may be considered the host of the virtual machines 220.

As mentioned above, virtualization services may be provided by a host operating system and/or a hypervisor. In some implementations, the hypervisor 210 may, for example, be a type 2 hypervisor running and/or integrated into some host operating system (not shown) that is in turn executing on the example computing device 100 and provides virtualization services. Alternatively, the hypervisor 210 may be a type 1 hypervisor running directly on the hardware of the example computing device 100. In a particular example, the hypervisor 210 may be the QNX™ Hypervisor. A type 1 hypervisor may be viewed as serving in the role of a host operating system itself, albeit a host operating system particularly tailored to providing the functionality of a hypervisor.

The subject of the present application relates to detection of security threats such as may arise where a virtual machine (e.g., one of the virtual machines 220) is executing a guest operating system hosted by a host operating system executing on a host computer system (e.g., the example computing device 100). Information security threats may arise in many computing contexts. For example, it may be that the example computing device 100 corresponds to an embedded computing device included in a vehicle. Such a vehicle may, for example, be or include vehicles such as a motor vehicle (e.g., automobiles, cars, trucks, buses, motorcycles, etc.), aircraft (e.g., airplanes, unmanned aerial vehicles, unmanned aircraft systems, drones, helicopters, etc.), a spacecraft (e.g., spaceplanes, space shuttles, space capsules, space stations, satellites, etc.), a watercraft (e.g., ships, boats, hovercraft, submarines, etc.), a railed vehicle (e.g., trains and trams, etc.), and/or another types of vehicles including any combinations of any of the foregoing, whether currently existing or after arising. Such a vehicle may run a host operating system (which may be or may include a hypervisor) and that host operating system may host one or more virtual machines such as may run a guest operating system. The guest operating system may, in turn, provide particular functionality such as, for example, an infotainment system. In a particular example, the example computing device 100 may correspond to an embedded control unit (ECU) or a vehicle such as an automobile and the guest operating system may provide user-interface for various features of the vehicle. For example, the guest operating system may provide a media player. In another example, whether or not in a vehicle, a guest operating system may provide functions such as, for example, a web browser, a file manager, and/or access to an online application store ("app store") such as may provide functionality including, for example, the possibility of installing new applications for use with the guest operating system. A variety of computer security threats could affect such a guest operating system. For example, where application installation is possible, a user could accidentally (or intentionally) install a malicious application (e.g., from an app store or a computer-readable medium). In another example, if a media player is provided, media could be provided for playback that is crafted to exploit one or more security vulnerabilities of the media player so as, for example, to allow arbitrary code execution and/or compromise of the guest operating system and its virtual machine. Notably, security threats affecting and/or compromise of a guest operating system may be significant, such as, for example, if the guest operating system is responsible for providing user interface in, for example, a vehicle. For example, if the guest operating system provides navigation functionality for the vehicle, a user could be misled into navigating to an unintended destination. More broadly, it is possible that a compromised guest operating system could be employed as a springboard/vector for attacking the host operating system. The implications thereof could be particularly serious: for example, in the case of vehicle such as an automobile, a compromised ECU could be used to attack other components of the vehicle including, potentially, components such as, for example, the engine, braking system, and/or steering. The subject matter of the present application may allow detection and/or addressing of security threats such as may affect a guest operating system hosted by a host operating system and its associated virtual machine and, also, potentially, security threats such as may affect the host operating system. For example, the subject matter of the present application may allow detection and/or mitigation of computer security threats consistent with the foregoing examples of threats to a vehicle embedded computer (e.g., threats to an ECU).

By way of overview, according to the subject matter of the present application, a guest operating system may be configured to run a monitoring process. The monitoring process may collect information about the state of the guest operating system. That information may then be forwarded to the host operating system for analysis to detect potential security threats.

Figure 3:
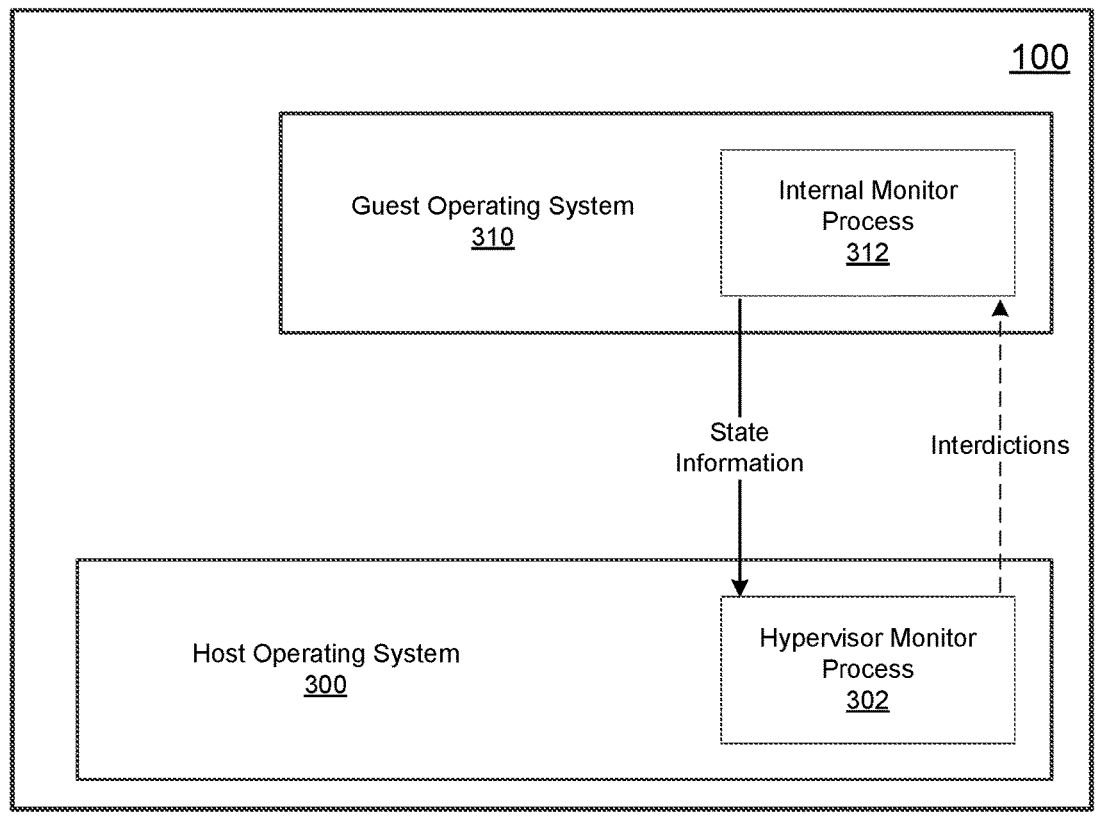
FIG. 3 is a high-level block diagram showing communications between a monitor process running on a host operating system and a monitor process running on a guest operating system within a virtual machine hosted by the host operating system.

An example of how a monitoring process running in a guest operating system may collect and forward state information to a host operating system is provided in FIG. 3.

As illustrated, a host operating system 300 (which may correspond to, provide, and/or support the hypervisor 210 (FIG. 2)) executing on the example computing device 100 hosts a guest operating system 310 executing on a virtual machine (e.g., one of the virtual machines 220) hosted by the host operating system 300.

A pair of monitoring processes—namely, a hypervisor monitor process 302 and an internal monitor process 312 co-operate—to collect information about the state of the guest operating system and for analysis of that state information regarding one or more security threats to the computer system. For example, the monitoring processes may co-operate to analyze that state information to identify one or more security threats to the guest operating system.

The hypervisor monitor process 302 runs in the host operating system 300. The hypervisor monitor process 302 may operate with a high privilege on the host operating system 300 and may, for example, run with privilege on the host operating system 300 equivalent to a hypervisor (hypervisor-privilege). As illustrated, the hypervisor monitor process 302 receives information about the state of the guest operating system 310 from the internal monitor process 312. That is, the internal monitor process 312 collects information about the state of the guest operating system 310 and then forwards that state information to the hypervisor monitor process 302. Put another way, the internal monitor process 312 closely tracks activity and information related to the health of the guest operating system 310 and applications installed in that context/processes running on the guest operating system 310. For example, the internal monitor process 312 may monitor inter-process communications (IPC) and/or communications (e.g., network) activity by/within the guest operating system 310. The internal monitor process 312 may operate with a high privilege on the guest operating system 310 and may, for example, run with privilege on the guest operating system 310 equivalent to a supervisory component thereof (supervisor-privilege) (e.g., to allow monitoring to be performed). Further examples and details of possible monitoring of the guest operating system 310 by the internal monitor process 312 are provided below.

Whatever its exact form and content, after the state information is forwarded by the internal monitor process 312 to the hypervisor monitor process 302, the received state information is then analyzed regarding one or more possible security threats to the guest operating system 310. For example, it may be that the state information is analyzed by the hypervisor monitor process 302 to identify one or more security threats to the guest operating system 310. Manners of analyzing state information regarding security threats are further described below. However the actual analysis of state information regarding security threats (e.g., to identify a security threat) is performed, should security threats be detected then, responsive to detection of security threats, the hypervisor monitor process 302 may trigger one or more actions intended to address identified security threats. For example, the hypervisor monitor process 302 may, as illustrated, send indications ("interdictions") of actions to be taken to address identified security threats to the internal monitor process 312. Responsive to the interdictions, the internal monitor process 312 may carry out one or more corresponding actions and/or otherwise cause such actions to be performed (e.g., by triggering those actions to be taken by some other component of/running on the guest operating system 310). Such actions may, for example, be actions for eliminating, mitigating, or otherwise addressing a detected security threat.

In some implementations, the hypervisor monitor process 302 may also monitor the guest operating system 310. For example, the hypervisor monitor process 302 may collect information about the guest operating system 310 as a whole. In a particular example, the hypervisor monitor process 302 may monitor the use of/invocation of services provided to the guest operating system 310 by the host operating system 300. Notably, where the hypervisor monitor process 302 monitors the guest operating system 310, information about the state of the guest operating system 310 that is so obtained may be analyzed together with information about the state of the guest operating system 310 that is received by the hypervisor monitor process 302 from the one or more other sources including, potentially, from the internal monitor process 312. (Notably, this information may be different due to the difference in data observable by those observers.) For example, state information observed by the hypervisor monitor process 302 directly may be correlated with state information received from the internal monitor process 312 in performing analysis to detect security threats. Notably, correlation of state information observed by different observers (e.g., the hypervisor monitor process 302 and the internal monitor process 312) and/or from different perspectives (e.g., from the perspective of the hypervisor monitor process 302 vs. the perspective of the internal monitor process 312) may allow insights (such as detection of a particular security threat) that are not available and/or are more difficult to make as compared to when analyzing data from only a single observer/perspective. Additionally or alternatively, because the hypervisor monitor process 302 and other observers/sources such as the internal monitor process 312 may be in different security domains, even if one such source is compromised by an attacker (which could allow the attacker to obscure a security threat/attack), another such source may escape attack/be subject to a lesser attack such that analysis based on data it provided may nonetheless allow the security threat/attack to be nonetheless detected.

Figure 4:
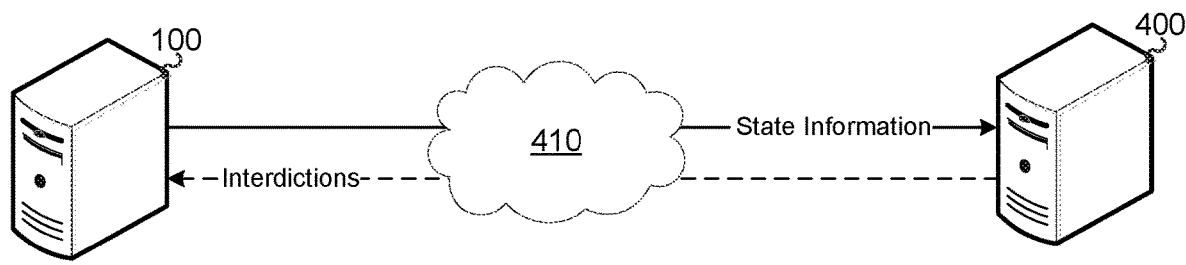
FIG. 4 is a high-level block diagram showing communications between the example computing device of FIG. 1 and a remote computer system.

Additionally or alternatively, in some implementations, a remote computer system (e.g., a cloud server) may be employed for detecting security threats to the example computing device 100 such as, for example, security threats to one or both of the host operating system 300 and the guest operating system 310. A high-level block diagram of an example operating environment including such a remote computer system is shown in FIG. 4.

As illustrated, the example computing device 100 may communicate state information about the state of operating systems executing on the example computing device 100 to a remote computer system 400 via a network 410. For example, the transmitted state information may relate to one or both of the guest operating system 310 and the host operating system 300. Such state information may, for example, be forwarded to the remote computer system 400 by one or both of the internal monitor process 312 and/or the hypervisor monitor process 302. Regardless of the component/source from which it is received, responsive to receiving state information about the example computing device 100, the remote computer system 400 may analyze received state information to detect information security threats to the example computing device 100 (e.g., threats to the guest operating system 310 and/or the host operating system 300). Such analysis may be conducted in a variety of manners as further described below. For example, such analysis may include manners of analysis consistent with and/or similar to the analysis of state information by the host operating system 300/hypervisor monitor process 302 to detect threats to the guest operating system 310. In some implementations, a monitor component similar to the hypervisor monitor process 302 (e.g., similar in terms of having the ability to receive and analyze state information) executing on the remote computer system 400 may be responsible for the receiving state information and/or for the analysis thereof regarding security threats to the example computing device 100. Additionally or alternatively, such a monitor component may be responsible for the identification of appropriate actions/interdictions to address identified security threats to the example computing device 100, and/or for the transmission of those actions/interdictions transmission to the example computing device 100 to be carried out. A monitoring component running on the remote computer system 400 may be or correspond to a process executing on an operating system thereof. In some implementations, such a monitoring component may be referred to as an "external monitor".

As mentioned above, the internal monitor process 312 forwards information about the state of the guest operating system 310 to the hypervisor monitor process 302. This forwarding may employ one or more of a variety of different possible communications channels/mechanisms (e.g., for communicating state information and/or interdictions). For example, it may be that network-based (e.g., socket) communication is employed. In a particular example, network-based communication may be employed, for communication between the hypervisor monitor process 302 and the internal monitor process 312 (e.g., via a loopback network component of the host operating system 300). In another particular example, network-based communication might be employed for communication between the example computing device 100 (e.g., by one or both of the hypervisor monitor process 302 and the internal monitor process 312) and the remote computer system 400 (e.g., via the network 410). In another example, a block of memory that is shared between the host operating system 300 and the guest operating system 310 may be employed for communication between the internal monitor process 312 and the hypervisor monitor process 302.

Communications between some or all of the internal monitor process 312, the hypervisor monitor process 302 and/or the remote computer system 400 may, in at least some implementations, be encrypted. Put another way, one or more encrypted channels may be employed for communication between some or all of the internal monitor process 312, the hypervisor monitor process 302 and/or the remote computer system 400. For example, information about the state of the guest operating system 310 may be sent by internal monitor process 312 to the hypervisor monitor process 302 over an encrypted channel.

Various mechanisms and methods may be employed in providing such an encrypted channel or channels. For example, Transport Layer Security (TLS) may be employed in providing such an encrypted channel such as, for example, if sockets are employed as an underlying mechanism. In another example, communications via a shared memory block (e.g., a memory block shared between the host operating system 300 and the guest operating system 310 as discussed above) may be encrypted. For example, it may be that an encrypted channel between the internal monitor process 312 and the hypervisor monitor process 302 employs a shared memory block, at least a portion of which holds encrypted data/communications. Put another way, an encrypted channel between the internal monitor process 312 and the hypervisor monitor process 302 (e.g., such as may be used by the internal monitor process 312 to send information about the state of the guest operating system 310 to the hypervisor monitor process 302) may employ a shared memory block. Encryption involving the host operating system 300 (and, potentially, the hypervisor monitor process 302 specifically) and/or the guest operating system 310 (and, potentially, the internal monitor process 312 specifically) may be based on trust relationships that are configured at an operating system provisioning time (e.g., before the example computing device 100 is exposed to insecure environments) for their respective operating system. In a particular example, during the provisioning of the host operating system 300, one or more encryption keys for use by the hypervisor monitor process 302 may be stored. In another example, it may, additionally or alternatively, be that during provisioning of the guest operating system 310, one or more encryption keys for use by the internal monitor process 312 are stored. Such encryption keys may, for example, be for use in establishing trusted channels such as, for example, between the internal monitor process 312 and the hypervisor monitor process 302. In at least some implementations, the trust relationships between the host operating system 300 (i.e., the hypervisor monitor process 302), the guest operating system 310 (i.e., the internal monitor process 312), and/or the remote computer system 400 may be segmented so that if trust/cryptographic information associated with one (e.g., the above-discussed encryption keys) are compromised, the others are not automatically compromised as well. Such trust segmentation may involve storage of such cryptographic/trust information in different places, such as, for example, in different hardware security modules (HSMs). For example, the host operating system 300 may store such information as is associated therewith in an HSM thereof. Additionally or alternatively, the guest operating system 310 may store trust/cryptographic information as is associated therewith in an HSM thereof (which may be virtualized).

Figure 5:
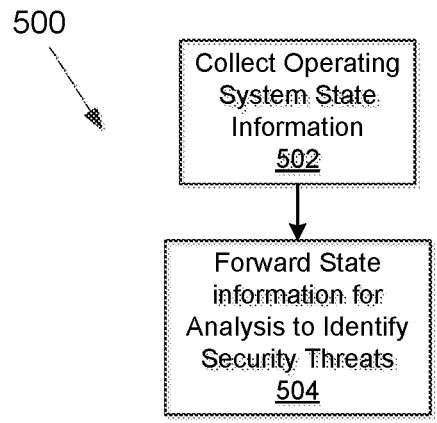
FIG. 5 provides a flow chart illustrating a method for providing information about the state of an operating system.
Figure 6:
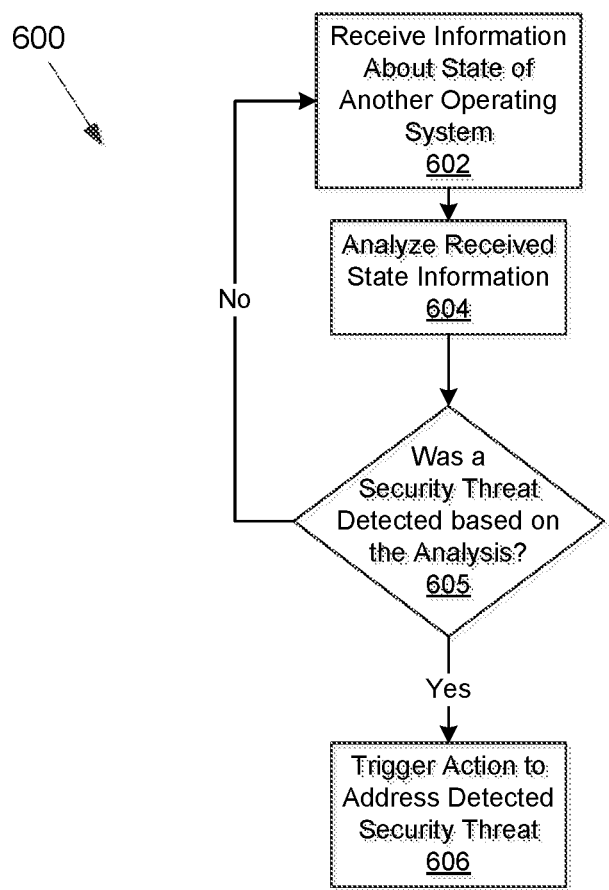
FIG. 6 provides a flow chart illustrating a method for detecting security threats based on received information about the state of an operating system.

Operations performed by the internal monitor process 312 and the hypervisor monitor process 302 will now be summarized with reference to FIGS. 5 and 6. FIGS. 5 and 6 provide flow charts illustrating methods comprising operations as may be performed by a processor of a computing device such as, for example, the processor 110 executing instructions in the context of the host operating system 300 and/or in the context of a virtualized processor (e.g., a processor of one of the virtual machines 220) executing instructions in the context of the guest operating system 310.

The discussion begins with FIG. 5.

FIG. 5 provides a flow chart illustrating a method 500 including operations 502 and onward. The method 500 may be performed by the internal monitor process 312 in monitoring the guest operating system 310 to collect information about the state thereof. Additionally or alternatively, the method 500 may, in some implementations, be performed by the hypervisor monitor process 302 such as, for example, in collecting information about the host operating system 300 for sending to the remote computer system 400 for analysis and/or in collecting information about the state of the guest operation system 310 by the hypervisor monitor process 302 as mentioned above.

At the operation 502, state information is collected. The monitored information may take a variety of forms. Examples of possible state information as may be collected will now be discussed.

First, information such as may be collected by the internal monitor process 312 will be discussed. As mentioned above, the internal monitor process 312 collects information about the state of the guest operating system 310. This information may, for example, include information about processes that execute on the guest operating system 310. In a particular example, information about processes that are created early in the start-up of the guest operating system 310 may be collected. For example, the name of the first (and potentially second, third, fourth, etc.) process created by the guest operating system 310, its file hash, and its immediate child processes (if any) may be collected. Notably, the initial setup of processes that start-up in an operating system are usually fixed or only vary slightly and deviations may be an indication of possible security threats (e.g., tampering with the guest operating system 310 and/or malicious software starting at start-up). In another example, the creation of child processes (e.g., forks) may be monitored. Notably, most processes in a system start/fork a fixed, usually small (e.g., 0 or 1) number of child processes. Accordingly, deviations may be an indication of possible security threats. In another example, most processes in an operating system start with a fixed set of capabilities, abilities, and/or permissions. Some processes may, however, acquire and/or relinquish some capabilities, abilities, and/or permissions such as, for example, to perform special/system functions. By monitoring capabilities, abilities, and/or permissions including, for example, acquisition and/or relinquishment thereof, deviations from expected capabilities, abilities, and/or permissions and activities related thereto (e.g., their unexpected acquisition and/or relinquishment) may be detected and this may potentially be an input to detecting security threats. In another example, certain permissions related operations may be monitored. For example, setting security related identifiers such as, for example, user identifiers (UIDs) and/or group identifiers (GIDs) are usually only employed by privileged processes and usually only at defined times (e.g., system start-up). Furthermore, a malicious process may attempt to tamper with/manipulate such identifiers for malicious purposes. Accordingly, such manipulation may be monitored. Other operations that could potentially be performed for malicious reasons may be similarly monitored. For example, devices are usually mounted/initialized by a single or a limited set of processes in most operating systems. Accordingly, device mounts (e.g., mounts of storage devices/volumes) may be monitored in an effort to detect possible security threats related to unexpected mounting. In another example, manipulation of sensitive operating system parameters may be monitored (e.g., library load paths, parameters provided/manipulated by a virtual filesystem such as/proc, etc.). In yet another example, software installation/uninstallation may be monitored such as, for example, the download of new applications and/or installation of new executables/packages. In some cases, this monitoring may be focussed on and/or include particular types of applications. For example, the installation, uninstallation, and/or overwriting of system components such as, for example shells (e.g., bash) may be monitored. In yet another example, it may be that one or more "canaries" are placed in the guest operating system 310 and/or the host operating system 300 that may notify an external observer (e.g., the hypervisor monitor process 302 or the remote computer system 400 in the case of the guest operating system 310 or, in another example, the remote computer system 400 in the case of the host operating system 300) of a compromise to the operating system in which the canary is placed. For example, a canary may include a file such as may be included in the environment of the guest operating system 310 and that, if accessed by an attacker, causes a signal to be sent to the hypervisor monitor process 302. In a particular example, such a file could be a dummy device that the system is configured not to access (and that does not connect to a readable device) but that may nonetheless appear to be a valid device to an attacker. The dummy device may be configured so that, if accessed, it signals the external observer (e.g., the hypervisor monitor process 302). The foregoing is merely by way of example and in a given implementation other state and/or some or all of the foregoing may be included in state being monitored and collected at the operation 502.

Turning to information such as may be collected by the hypervisor monitor process 302 if it is performing the method 500, some or all of the same information as is collected by the internal monitor process 312 regarding guest operating system 310 may also be collected by the hypervisor monitor process 302. For example, the hypervisor monitor process 302 may collect similar and/or identical information about the host operating system 300 such as, for example, for forwarding to the remote computer system 400. Additionally or alternatively, the hypervisor monitor process 302 may collect other information. For example, the hypervisor monitor process 302 may collect information about the guest operating system 310. For example, the hypervisor monitor process 302 may, for example, collection information about network connections by the guest operating system 310, access by the guest operating system 310 to virtual devices that correspond to physical devices run under the context of/virtualized by the host operating system 300, and/or about operations performed by the guest operating system 310 related to virtualization and/or the hypervisor such as, for example, messages to a hypervisor manager component.

Following the operation 502, an operation 504 is next.

At the operation 504, the state information collected at the operation 502 is forwarded for analysis. This information may be forwarded in manners discussed above. For example, where the method 500 is being performed by the internal monitor process 312, collected state information may be forwarded to the hypervisor monitor process 302 via shared memory and/or to the remote computer system 400 via the network 410. In another example, where the method 500 is being performed by the hypervisor monitor process 302, collected state information may be forwarded to the remote computer system 400 via the network 410 and/or used in analysis to detect security threats to the guest operating system 310 (e.g., by forwarding state information to another subcomponent of the hypervisor monitor process 302/the host operating system 300 such as may be responsible for performing such analysis).

Following the operation 504, the method may, in some implementations, continue (e.g., until the component/process performing it terminates) such as, for example, by returning to the operation 502 to collect further operating system state information.

Referring now to FIG. 6, the analysis of state information will now be discussed with reference to FIG. 6.

FIG. 6 provides a flow chart illustrating a method 600 including operations 602 and onward. The method 600 may, for example, be performed by a processor executing instructions corresponding to the hypervisor monitor process 302 analyzing state information related to the guest operating system 310. Additionally or alternatively, the method 600 may, in some implementations, be performed by a processor of the remote computer system 400 (e.g., by an external monitor process running thereon) such as, for example, in analyzing information about the guest operating system 310 and/or the host operating system 300 as may provided to the remote computer system 400 by the hypervisor monitor process 302 and/or the internal monitor process 312 as discussed above.

At the operation 602, information about the state of another operating system is received (i.e., an operating system other than running the process/software performing the method 600). This, for example, may correspond to information sent by internal monitor process 312 and/or the hypervisor monitor process 302 such as, for example, in performing the operation 504 (FIG. 5) of the method 500 as discussed above. In some cases the received information may be or may correspond to information collected at the operation 502 of the method 500. Additionally or alternatively, some or all of the received information may be state information such as may be derived therefrom such, as for example, by through aggregation of collected state information prior to sending.

Following the receipt of state information at the operation 602, an operation 604 is next. At the operation 604, the received information is analyzed regarding security threats to the operating system being monitored. For example, where the received information relates to the guest operating system 310, it may be analyzed regarding security threats to the guest operating system 310—e.g., to identify security threats to the guest operating system 310. In some cases, other information may also be considered as a part of the analysis. For example, where the method 600 is being performed by the hypervisor monitor process 302, information about the guest operating system 310 such as may have been collected by the hypervisor security monitor 302 as discussed above may also be considered. Additionally or alternatively, if the method 600 executes in a loop as discussed below, it may be the state information received during a given iteration of the method 600 is also considered in one or more following iterations. For example, it may be that patterns of behavior over time such as may relate to security threats are detected in this way.

Analysis of information regarding possible security threats may take a variety of forms and may involve a variety of techniques. In some cases, the analysis may seek to identify abnormal behavior by the other operating system. For example, where state information about the state of the host operating system 300 and/or the guest operating system 310 is sent to the remote computer system 400 (FIG. 4), the remote computer system 400 may identify security threats to the computer system based on a detection of abnormal behaviour by one of both of the host operating system 300 and/or the guest operating system 310. This detection may, for example, be based on a comparison between the information about the state of the guest operating system 310 and/or the information about the state of the host operating system 300 to state information provided by other computer systems (e.g., about the state of host and/or guest operating systems executing on those machines).

In some cases, machine learning techniques/models may be employed as a part of the analysis. For example, analysis regarding security threats may employ a machine learning model trained to identify abnormal behavior by the operating system being monitored. For example, a machine learning model trained to identify abnormal behavior by the guest operating system 310 may be employed in analysis related to possible security threats to the guest operating system 310. Such a machine learning model may be generated and trained in a variety of manners such as, for example, using machine learning techniques and technologies as may be known to skilled persons. In a particular example, such a machine learning model may be trained over time based on information about the state of an operating system (e.g., the guest operating system 310) to train the model to distinguish abnormal behavior of that operating system from normal behavior of that operating system. In some cases, such training of the model and/or the model retaining thereof may happen at defined intervals and/or triggered by particular events. For example, the model may be trained/re-trained at initial ownership, after the installation of a new application, after an update to one or more of the operating systems, and/or once a defined period has elapsed (e.g., for collection of new state information) following such a triggering event. In another example, a machine learning model as may be employed by the remote computer system 400 (FIG. 4) may be trained to identify abnormal behavior by one of both of the host operating system 300 and/or the guest operating system 310 using state information collected from other computer systems (e.g., information collected about the state of host and/or guest operating systems executing on those machines) over time. Put another way, the above-mentioned comparing of information about the state of the host operating system 300 and/or the guest operating system 310 to state information provided by other computer systems may be based on analysis using such a machine learning model. Notably, a remote server may be able to maintain information about state of operating systems executing on the example computing device 100 and/or other systems over time for longer periods and/or may be able to employ more sophisticated machine learning techniques such as, for example, cloud-based techniques employing a cluster of computing devices. For example, federated learning techniques may be employed. Whether at the local machine level (e.g., within the example computing device 100) and/or cloud level (e.g., at the remote computer system 400), in some cases, analysis may include the making of inferences based on machine learning models.

In some cases, rules and/or rules matching techniques (e.g., as in some expert systems in other domains) may, additionally or alternatively, be employed as part of the analysis. For example, it may be that an analysis to detect security threats to another operating system (e.g., to the guest operating system 310) includes comparing information about the state of that operating system to one or more rules, with each of those rules being intended to match one or more possible threats to that operating system. As an example of a possible rule, the guest operating system 310 mounting an unexpected USB device (e.g., because a user inserted a device into a USB port which may, for example, be intended only for servicing) and accessing an unexpected application on that device may be matched as a security threat (e.g., an attempt to use/install an unauthorized application). Notably, where such rules are employed, they may be serviced/updated over time. For example, updated rules may be downloaded from/pushed by from an update server (e.g., by, for, and/or on behalf of the hypervisor monitor process 302).

However analyzed, following the analysis at the operation 604, a determination as to whether or not a security threat is detected is made at an operation 605. If a security threat is detected, an operation 606 is next. Alternatively, if no security threat is detected the method 600 may, in at least some implementations, return to the operation 602 to receive further state information. For example, a component (e.g., the hypervisor monitoring process 302) performing the method 600 may do so in a loop until terminated.

At the operation 606, responsive to identifying a security threat at the operation 604, one or more actions intended to address that security threat are triggered. Notably, this may involve the sending of one or more interdictions as discussion above. For example, where the method 600 is being performed by the hypervisor monitor process 302, triggering one or more actions intended to address the security threat may involve sending an indication of actions to be performed to the internal monitor process 312.

The triggered actions may take a variety of forms and may depend on the nature and/or details of security threat they are intended to address. For example, where a detected security threat relate to a particular application installed on the guest operating system 310 (e.g., that a potentially malicious application was installed and/or accessed), triggering actions to address the threat may include triggering uninstallation of that application and/or triggering or updating of that application (e.g., if it has a known security threat but that thread is fixed in an updated version).

Whatever the action triggered, following triggering of the action to address the identified threat, the operation 606 completes. Following the operation 606, if the method 600 is running in a loop as discussed above, control flow may, for example, return to the operation 602. Alternatively, it may be that the method 600 terminates following the operation 606.

The above description is by way of example and is capable of variation without deviating from the subject matter of the present application. For example, although the description is made in terms of a single guest operating system (i.e., the guest operating system 310), it is possible that the host operating system 300 also hosts additional virtual machines and/or guest operating systems, some or all of which may also have an associated internal monitor sending information about the state of those guest operating systems to the host operating system 300. Such state information may also be sent to the hypervisor monitor process 302 (e.g., to another thread thereof) and/or to another monitor process running on the host operating system 300 such as, for example, other processes running the same software as the hypervisor monitor process 302. In a specific example, it may be that the host operating system 300 also hosts a second virtual machine running a second guest operating system and that the hypervisor monitor process 302 also receives information about the state of the second guest operating system.

A scenario illustrating a possible application of the subject matter of the present application will now be provided to illustrate detection and addressing of a security threats according to the subject matter of the present application.

As an example scenario, consider that an automotive-related guest operating system may be running atop a host operating system in an automobile. For example, it may be that Android™ Automotive is running atop QNX Hypervisor on an embedded computing device of a vehicle. A user may attempt to install a malicious package (e.g., an Android Package (APK) corresponding/including the malicious application). The user may not be aware that the APK is malicious. An internal monitor process running on the aforementioned guest operating system may send details of the package to a hypervisor monitor process running on the host operating system and/or to a remote computing device (e.g., as/as a part of information about the state of the guest operating system). One or both of the hypervisor monitor process and/or the remote computing device may then analyze the received information (including the information about the package), thereby detecting the security threat stemming from the malicious package. An interdiction (actions) may then be sent to the internal monitor process on the guest operating system to block the installation. Additionally, user interface may be provided related to the security threat (e.g., indicating that a malicious package was detected and installation was blocked).

It will be appreciated that it may be that some or all of the above-described operations of the various above-described example methods may be performed in orders other than those illustrated and/or may be performed concurrently without varying the overall operation of those methods.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A computer system comprising:
   at least one processor; and
   a memory coupled to the at least one processor and storing instructions corresponding to a host operating system that, when executed by the at least one processor, cause the host operating system to host a virtual machine executing a guest operating system, the guest operating system running an internal monitor process that collects information about the state of the guest operating system and forwards that information to a remote computer system for analysis regarding a security threat to the guest operating system,
   wherein abnormal behavior is identified by a comparison of the information about the state of the guest operating system to state information provided by a plurality of other computer systems.

2. The computer system of claim 1, wherein the analysis regarding a security threat to the guest operating system includes executing a machine learning model trained to identify abnormal behavior by the guest operating system.

3. The computer system of claim 2, wherein the machine learning model is trained over time based on the information about the state of the guest operating system to distinguish abnormal behavior by the guest operating system from normal behavior by the guest operating system.

4. The computer system of claim 1, wherein the analysis regarding a security threat to the guest operating system includes comparing the information about the state of the guest operating system against one or more rules, each of the rules intended to match one or more possible threats to the guest operating system.

5. The computer system of claim 1, wherein a hypervisor monitor process running on the host operating system forwards information about the state of the host operating system to the remote computer system for use in the analysis to identify security threats to the computer system.

6. The computer system of claim 1, wherein the remote computer system identifies security threats to the computer system based on a detection of abnormal behavior by at least one of the host operating system or the guest operating system.

7. The computer system of claim 1, wherein the remote computer system identifies abnormal behavior by a comparison of information about the state of the host operating system to state information provided by the plurality of other computer systems.

8. The computer system of claim 7, wherein the comparison of the information about the state of the guest operating system and the information about the state of the host operating system to state information provided by the plurality of other computer systems is based on analysis of the information about the state of the guest operating system and the information about the state of the host operating system using a machine learning model trained to identify abnormal behavior using state information collected from the plurality of other computer systems over time.

9. The computer system of claim 1, wherein the hypervisor monitor process triggers one or more actions responsive to detection of a security threat by the guest operating system.

10. The computer system of claim 1, wherein the host operating system also hosts a second virtual machine, and wherein the hypervisor monitor process also receives information about the state of a second guest operating system executing on the second virtual machine.

11. A computer-implemented method comprising:
    collecting, by an internal monitor process running on a guest operating system executing on a virtual machine hosted by a host operating system of a computer system, information about the state of the guest operating system;
    sending, by the internal monitor process to a remote computer system, the information about the state of the guest operating system for analysis regarding a security threat to the guest operating system; and identifying abnormal behavior by comparing the information about the state of the guest operating system to state information provided by a plurality of other computer systems.

12. The method of claim 11, wherein the security threat relates to a particular application installed on the guest operating system and further comprising, responsive to detecting the security threat, triggering an uninstallation of the particular application or an update to the particular application.

13. The method of claim 11, wherein the information about the state of the guest operating system is sent by the internal monitor process to the hypervisor monitor process over an encrypted channel.

14. The method of claim 13, wherein the encrypted channel employs a shared memory block.

15. The method of claim 13, further comprising:
during provisioning of the host operating system, storing a first key for use by the hypervisor monitor process; and
during provisioning of the guest operating system, storing a second key for use by the internal monitor process,
wherein the encrypted channel is established using the first key and the second key.

16. The method of claim 15, wherein at least one of the first key or the second key is stored in a hardware security module.

17. A non-transitory computer-readable storage medium storing instructions corresponding to a first operating system adapted to host a virtual machine executing a guest operating system, the guest operating system running an internal monitor process that collects information about the state of the guest operating system and forwards that information to a remote computer system for analysis regarding a security threat to the guest operating system,
wherein abnormal behavior is identified by a comparison of the information about the state of the guest operating system to state information provided by a plurality of other computer systems.

18. The non-transitory computer-readable storage medium of claim 17, wherein the first operating system is adapted to analyze the information using a machine learning model trained to detect possible security threats.

19. The non-transitory computer-readable storage medium of claim 17, further storing instructions corresponding to forwarding the information about the state of the guest operating system to the first operating system for analysis to detect security threats.

20. The computer system of claim 1, wherein the guest operating system running the internal monitor process that collects information about the state of the guest operating system forwards that information to a hypervisor monitor process running on the host operating system for analysis regarding the security threat to the guest operating system.

* * * * *